US006253458B1

(12) United States Patent
Raab et al.

(10) Patent No.: US 6,253,458 B1
(45) Date of Patent: Jul. 3, 2001

(54) ADJUSTABLE COUNTERBALANCE MECHANISM FOR A COORDINATE MEASUREMENT MACHINE

(75) Inventors: Simon Raab, Maitland; John A. Bodjack, Sauford, both of FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 09/444,467

(22) Filed: Nov. 22, 1999

Related U.S. Application Data

(60) Provisional application No. 60/111,419, filed on Dec. 8, 1998, and provisional application No. 60/138,989, filed on Jun. 14, 1999.

(51) Int. Cl.[7] .................................................. G01B 5/004
(52) U.S. Cl. ......................... 33/503; 33/504; 33/1 N; 901/48; 901/25; 74/490.05
(58) Field of Search ........................... 33/503, 504, 1 N; 901/48, 28, 25, 15; 74/126, 142, 490.05

(56) References Cited

U.S. PATENT DOCUMENTS

| 5,768,792 | * | 6/1998 | Raab | 33/503 |
| 5,794,356 | * | 8/1998 | Raab | 33/504 |
| 5,829,148 | * | 11/1998 | Eaton | 33/503 |
| 5,890,300 | * | 4/1999 | Brenner et al. | 33/503 |
| 5,926,782 | * | 7/1999 | Raab | 33/503 |
| 5,978,748 | * | 11/1999 | Raab | 33/503 |
| 6,131,299 | * | 10/2000 | Raab et al. | 33/504 |
| 6,134,506 | * | 10/2000 | Rosenberg et al. | 33/504 |
| 6,151,789 | * | 11/2000 | Raab et al. | 33/503 |

\* cited by examiner

*Primary Examiner*—Diego Gutierrez
*Assistant Examiner*—Yaritza Guadalupe
(74) *Attorney, Agent, or Firm*—Cantor Colburn LLP (57) ABSTRACT

A counterbalance mechanism for use with a multi-joint manually positionable measuring arm of a three dimensional coordinate measurement system provides a reversible and adjustable counterbalancing force to offset the weight of the arm and facilitate its movement. The counterbalance mechanism of the present invention acts within the plane of the joint minimizing the moment arm created by the joint and allowing for low overhung loads transmitted from the arm to the base.

8 Claims, 14 Drawing Sheets

ADJUSTABLE COUNTERBALANCE MECHANISM FOR A COORDINATE MEASUREMENT MACHINE

CROSS-REFERENCE TO RELATED APPLICATIONS

This application claims the benefit of U.S. provisional patent application 60/111,419 filed Dec. 8, 1998, the contents of which are incorporated herein by reference, and claims the benefit of U.S. provisional patent application 60/138,989 filed Jun. 14, 1999, the contents of which are incorporated herein by reference.

BACKGROUND OF INVENTION

1. Field of Invention

This invention relates generally to three dimensional coordinate measuring machines (CMM's). More specifically this invention relates to an arm and counterbalance mechanism for use on a CMM which provides increased reliability and adjustability.

2. Description of the Prior Art

It is well known in the art to utilize a CMM to measure objects in a space in terms of their X, Y, and Z coordinates commonly referring to length, width and height, respectively. Advancement in the art has led to lightweight portable CMM's well suited for general industrial applications. Such a CMM is disclosed in U.S. Pat. No. 5,402,582 which is commonly assigned to the assignee hereof and incorporated herein by reference.

Figure 1:
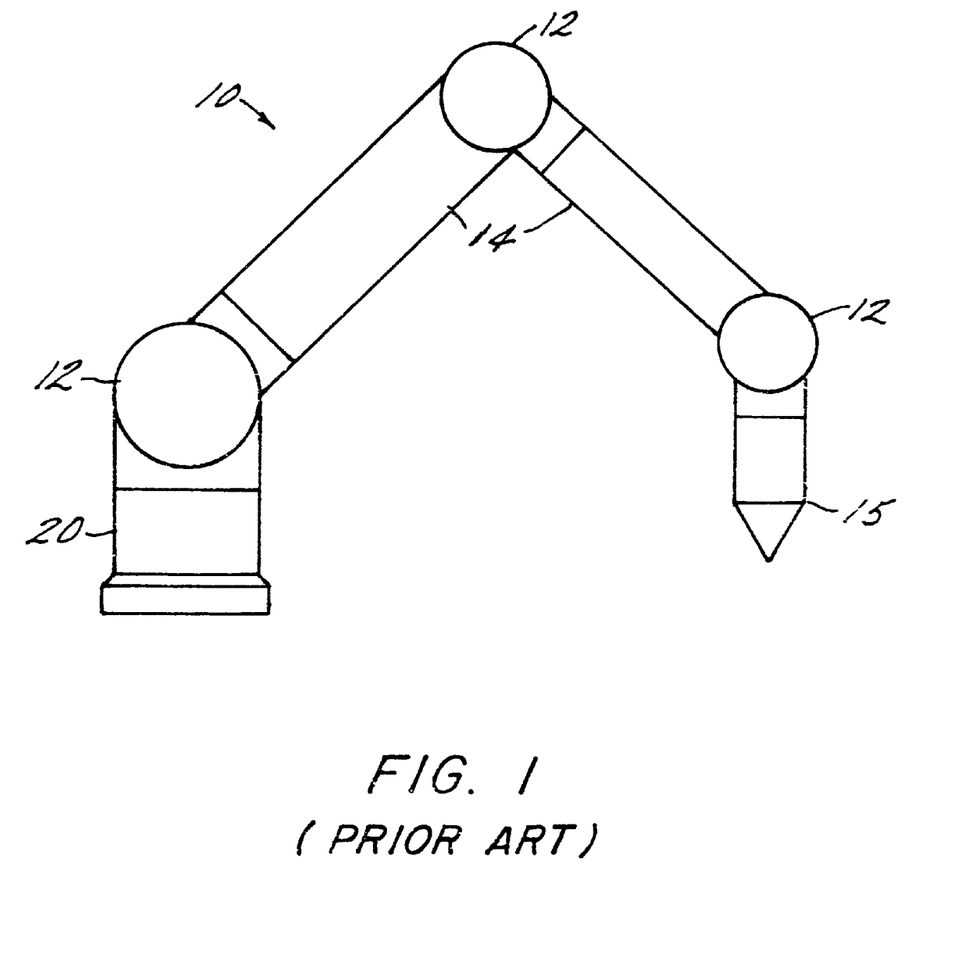
FIG. 1 is a side elevational view of a conventional CMM arm.

One of the above mentioned advancements in the art of portable CMM's is a light weight multi-jointed manually positionable measuring arm, shown generally in FIG. 1 at 10. Measuring arm 10 is comprised of a plurality of transfer housings 12 (with each transfer housing comprising a joint and defining one degree of rotational freedom) and extension members 14 attached to each other with adjacent transfer housings being disposed at right angles to define a movable arm 10 preferably having multiple degrees of freedom. At one end of arm 10 is attached a base 20. At the end of arm 10 opposite base 20 is attached a probe 15.

Figure 2:
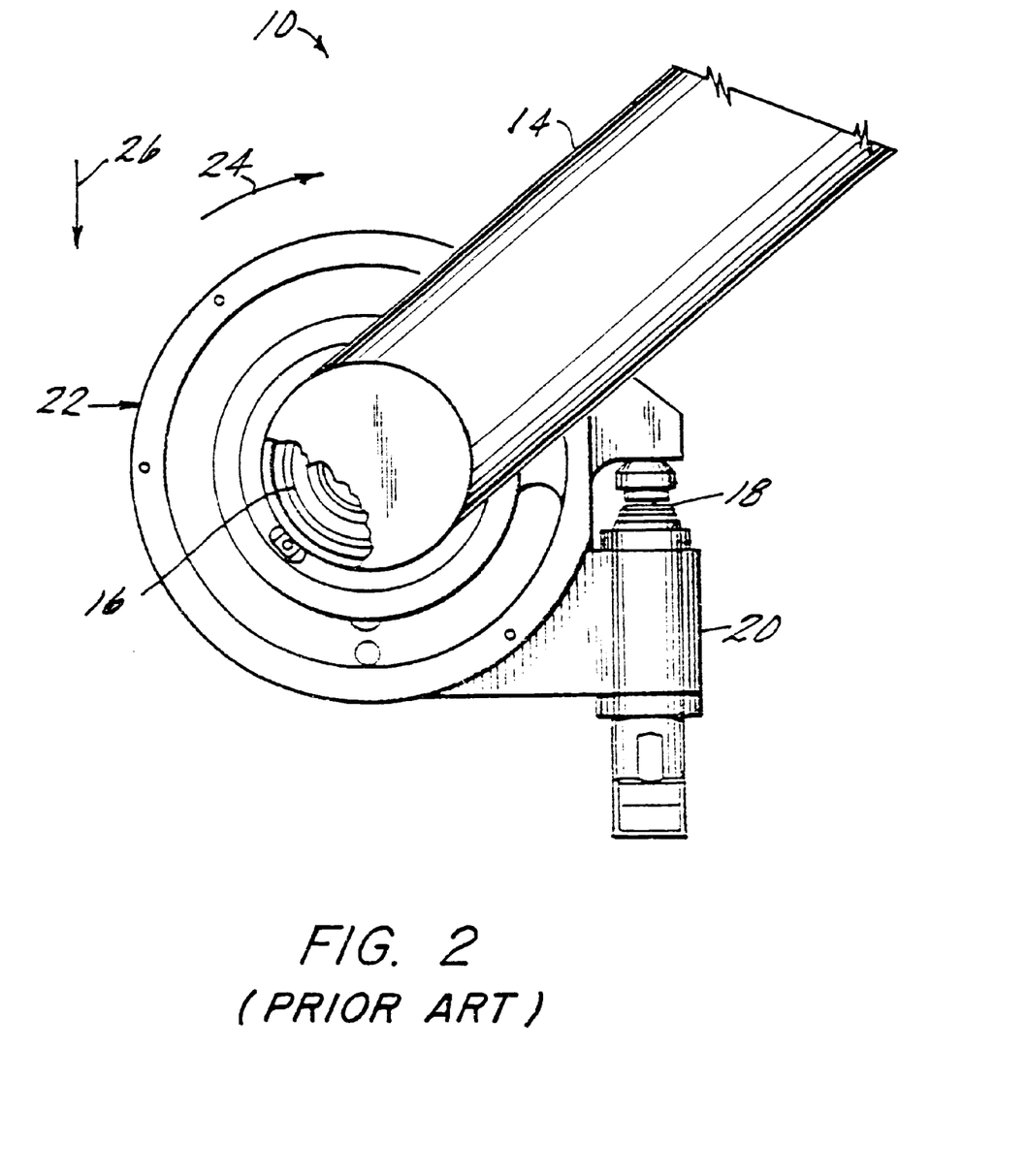
FIG. 2 is a side elevational view of a conventional counterbalancing mechanism.

Referring to FIG. 2, the measuring arm 10 of the prior art further comprises a torsional spring 16 positioned in a joint 22 near base 20 of measuring arm 10. The torsional spring 16 provides a counter balance force to offset the weight of the arm and ease manipulation thereof by an operator. An air piston shock absorber 18 is mounted on base 20 of arm 10 in intimate contact with joint 22 such that piston 18 is fully compressed when arm 10 is in rest position, as is shown. Piston 18 is fully decompressed and awaiting retraction of arm 10 when said arm is fully extended. Air piston 18 absorbs the shock load accompanying the spring coiled retraction of arm 10 by exerting a force opposite to said retraction.

The base 20 of CMM arm 10 of the prior art is typically mounted in the horizontal plane. Referring again to FIG. 2, the recoiled torsional spring 16 generates a compensating torque at the base 20 of the arm 10 in a direction 24 to considerably reduce the weight of the arm 10, said weight acting in a direction 26 when arm 10 is extended. Such alignment allows for a counterbalanced use of the arm 10 when base 20 is mounted in the horizontal plane as described herein above. However, there are many applications of CMM's where it is advantageous to mount the arm perpendicular to or inverted to the above discussed original mounted horizontal plane. For instance, it is often desired in the art to mount the arm 10 to a wall or to a ceiling to facilitate a particular use of the CMM. This mounting naturally changes the direction 26 of the weight of the arm 10 relative to said arm. The compensating torque 24, however, created by torsional spring 16 remains the same. Thus, the effect of the arm's spring coiled counterbalancing mechanism is diminished. Without the aid of the counterbalancing mechanism, use of the arm 10 may be cumbersome.

Prior art CMM arms, as discussed above, do not readily allow multiple applications requiring changability of a single CMM. For instance, a single CMM may be used by a variety of operators who may require different counterbalancing forces to effect a proper movement of the machine. Different end probes may be required for various application and alternative mountings may be necessary. The CMM arms of the prior art do not readily allow adjustability of the counterbalancing mechanism to compensate for the change in forces acting upon the arm associated with use of various mountings and end probes.

The positioning of the torsional spring counterbalance of the prior art CMM arm causes a high overhung load. As discussed herein above the counterbalance mechanism is positioned in a joint near the base of the arm. Such positioning creates a substantial moment arm from the neutral axis of joint previous to the mechanism. The majority of the weight of the measuring arm acts on this moment arm and creates a considerable load on the joint and on the base thereby reducing operability and increasing stress on the base assembly of the CMM arm.

Thus the need has arisen for a CMM arm with a mechanism which allows for the counterbalanced use of the arm in a variety of mountings, with a variety of end probes which prevents overhang stress on the base of the arm and provides ease in changability.

SUMMARY OF THE INVENTION

The above discussed and other drawbacks and deficiencies of the prior art are overcome or alleviated by the present invention. A novel counterbalance mechanism for use with a multi-joint manually positionable measuring arm of a three dimensional coordinate measurement system provides a reversible and adjustable counterbalancing force to offset the weight of the arm and facilitate its movement. An exemplary counterbalance device comprises a ratchet mechanism to select the direction of counterbalance assistance allowing for the mounting of the arm on a horizontal plane, a wall or a ceiling. In one embodiment, the exemplary counterbalance mechanism further comprises a compression spring which adjustably biases a cable and a system of intermeshing gears to provide varying levels of counterbalancing force. Alternatively, a second embodiment of the exemplary counterbalance mechanism comprises a cam assembly around which a member is rotated and counterbalanced by an internal compression spring. The counterbalance mechanism of the present invention acts within the plane of the joint minimizing the moment arm created by the joint and allowing for low overhung loads transmitted from the arm to the base. The mechanism of the present invention is readily adjustable to accommodate a variety of uses and mounting positions.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several figures.

DETAILED DESCRIPTION OF THE PREFERRED EMBODIMENT

Figure 3:
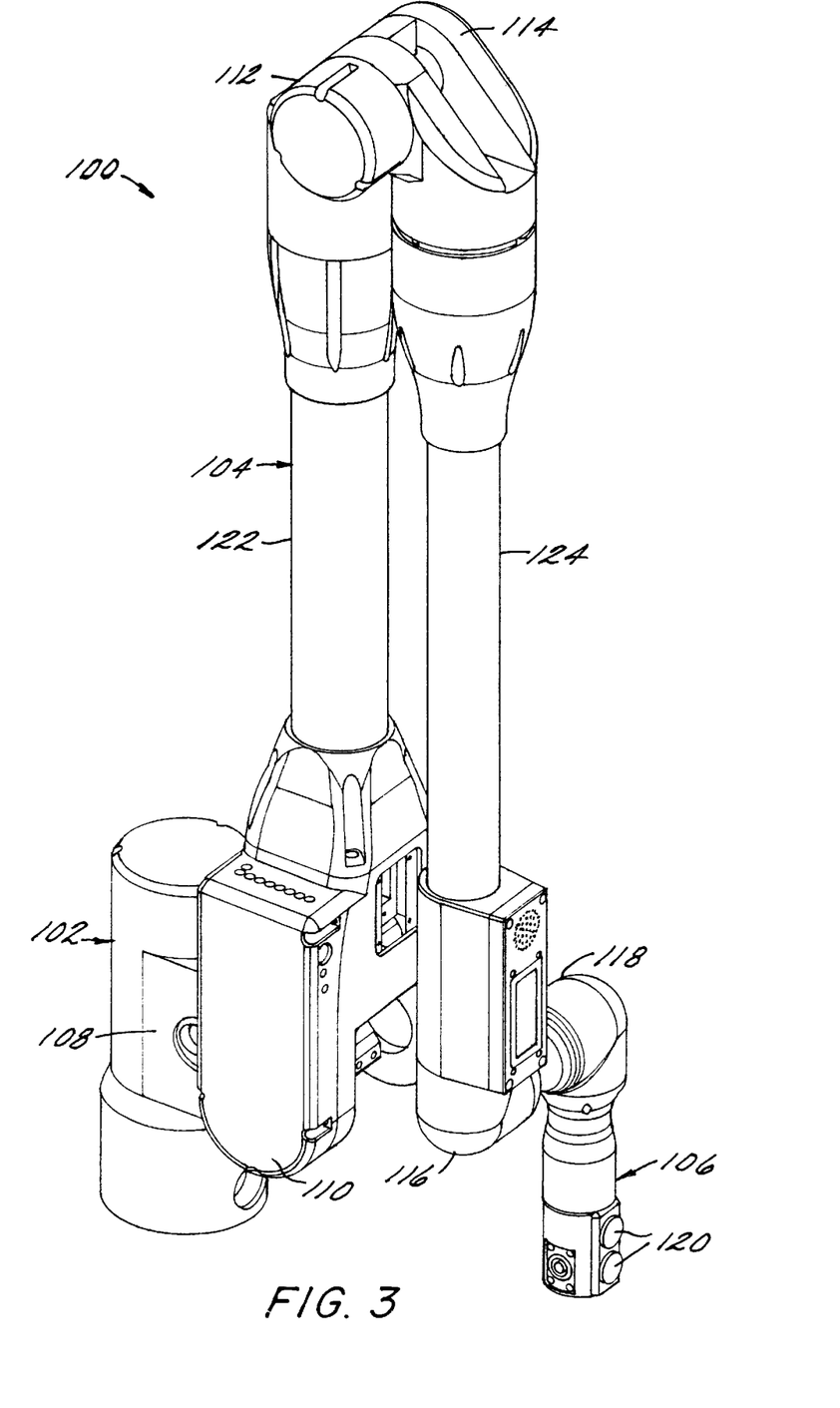
FIG. 3 is an isometric view of an arm of a three dimension coordinate measurement system incorporating a counterbalance mechanism of the present invention.

An exemplary multi-jointed manually operated coordinate measuring machine (CMM) arm is shown generally at 100 in FIG. 3. Arm 100 is substantially comprised of a base 102, an extension assembly 104, and a probe end 106. Arm 100 further comprises a first transfer housing 108, a second transfer housing 110, a third transfer housing 112, fourth transfer housing 114, a fifth transfer housing 116, and a sixth transfer housing 118. Base 102 is shaped substantially as a cylindrical solid and may be mounted to a horizontal surface, a wall, or a ceiling, as is discussed more fully herein below. Extension assembly 104 includes a first extension member 122 and a second extension member 124 of substantially similar lengths. Probe end 106 includes a buttons 120 to facilitate CMM usage. First extension member 122 is positioned between second transfer housing 110 and third transfer housing 112. Second extension member 124 is positioned between fourth transfer housing 114 and fifth transfer housing 116.

A counter balance mechanism 200, as will be described more fully herein below, is disposed within transfer housing 10. It will be appreciated that the components of arm 100 accumulate into a total weight of approximately 15 pounds. The counterbalance mechanism of the present invention partially offsets the effects of gravity on the arm by reacting the forces within transfer housing 110 and transmitting them through base 102. Such redistribution of the forces of gravity acting on the arm 100 reduces fatigue of the operator and wear at the transfer housings.

Figure 4:
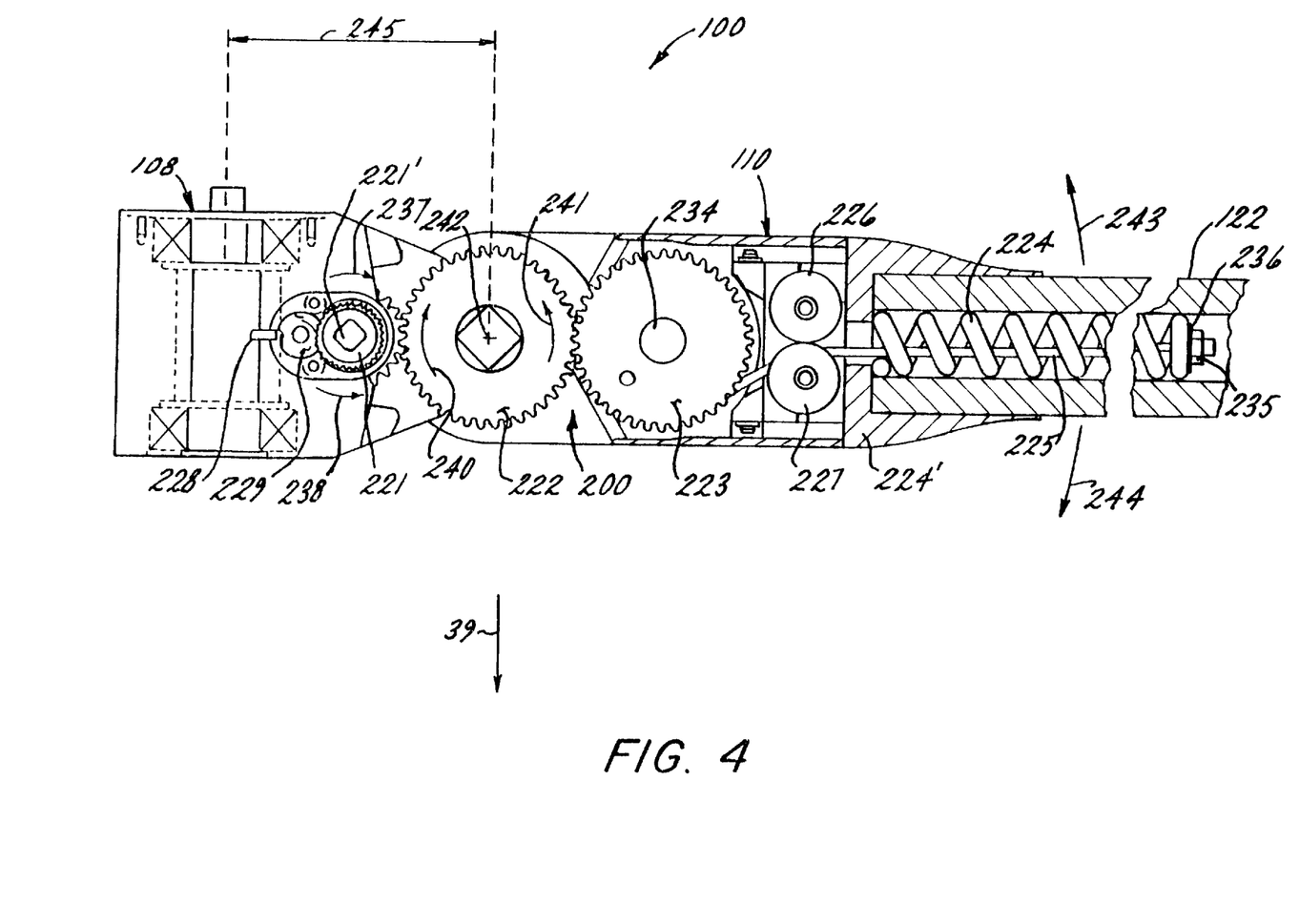
FIG. 4 is a side elevational view in partial section of an exemplary counterbalance mechanism.

Referring now to FIG. 4, transfer housings 108 and 110 are shown incorporating a counterbalance mechanism 200 in accordance with an embodiment of the present invention. Counterbalance mechanism 200 generally includes a ratchet gear 221, a transmission gear 222, a cable coil gear 223, a compression spring 224, a cable 225, and roller guides 226 and 227.

Figure 5:
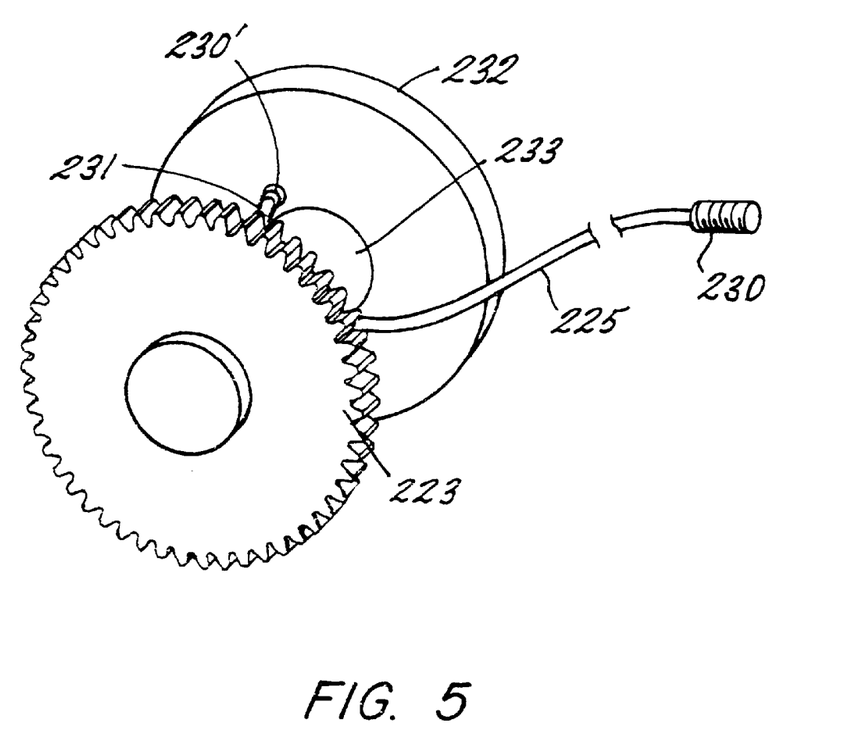
FIG. 5 is an isometric view of a cable coil gear and cable.

Ratchet gear 221 is rotatably disposed in transfer housing 108, meshing with transmission gear 222. Transmission gear 222 is rotatably disposed in transfer housing 110 in meshing engagement with cable coil gear 223 which is also rotatably disposed in transfer housing 110. Compression spring 224 is disposed within first extension 122 and is separated from the gear arrangement of counterbalance mechanism 200 by a barrier member 224' which is mounted perpendicular to the axis of compression spring 224 and adjacent to the base of said spring. Roller guides 226 and 227 are mounted proximate to each other in transfer housing 110 adjacent to barrier member 224' opposite compression spring 224. Cable 225 extends, at one end, through roller guides 226 and 227 into transfer housing 110 where it is fixed to cable coil gear 223. At a second end, cable 225 extends from roller guides 226 and 227 through barrier member 224' and through the axis of compression spring 224. Referring now to FIG. 5, cable 225 includes an adjustable threaded end 230 and a ball end 230'. Ball end 230' of cable 225 is secured within a slot 231 of a disk 232. Disk 232 is rigidly connected to cable coil gear 223 by a cable spindle 233. Referring again to FIG. 4, disk 232 and cable coil gear 223 are rotatably supported within transfer housing 110 on axle 234. Threaded end 230 of cable 225 is secured to the end of compression spring 224, opposite barrier member 224', by use of a washer 236 and a nut 235. When cable spindle gear 223 is rotated about axis 234 cable 225 winds around cable spindle 233 in a clockwise or counterclockwise direction depending upon the direction of rotation of cable spindle gear 223. The winding of cable 225 around cable spindle 233 shortens the extended length of cable 225 thereby creating a tension. This tension in cable 225 is transferred to spring 224 via washer 236 and nut 235 hence resulting in the compression of spring 224. The spring 224 exerts a counter force opposite the direction of compression. It is this counter force which counterbalances arm 100 as will be discussed in further detail herein.

Counterbalance mechanism 200 further includes a direction locking key 228 and a pawl 229. Locking key 228 is coupled to pawl 229 which engages ratchet gear 221 to selectively permit rotation of the ratchet gear 221. Ratchet gear 221 includes a drive aperture 221', shown in this particular embodiment as adaptable to receive a standard square drive tool end (not shown).

Still referring to FIG. 4, the force of gravity acting on arm 100 is shown, for purposes of illustration, as acting in the direction of arrow 39. Pawl 229 is positionable in one of two positions, as discussed above, to allow adjustment of ratchet gear 221. A first position of pawl 229, that illustrated in FIG. 4, allows ratchet gear 221 to rotate only in the direction of arrow 237. When transfer housing 110 is rotated relative to transfer housing 108 with pawl 229 positioned as described above, cable 225 is wound onto spindle 233 of FIG. 5 against roller guide 227 thereby compressing spring 224. The compression in spring 224 causes tension in cable 225 which in turn produces a torque in cable coil gear 223. The torque in cable coil gear 223 is transferred to transmission gear 222 in the direction represented by arrow 240. As noted above, the position of pawl 229 prevents movement of ratchet gear 221 in a direction opposite to that of arrow 237 thus the torque experienced in transmission gear 223 is reacted into base 102 by ratchet gear 221. The torque produced in transmission gear 222 in the direction of arrow 240 causes a moment about center of rotation 242 of arm 100 in the direction represented by an arrow 243 thereby counteracting a moment 244 produced by the force of gravity 39.

It will be appreciated that sufficient torque is achieved through the adjustment of ratchet gear 221 to offset the weight of arm 100 thereby providing a counterbalance for the system. It will also be appreciated that the amount of torque provided by counterbalance mechanism 200 is easily varied by rotation of ratchet gear 221 and can be adjusted to allow varying degrees of counterbalancing force for different operators and end effectors.

A further feature of the present invention is the ability to reverse the direction of torque provided by the counterbalance mechanism 200. The utility of this feature is realized when the force of gravity acts in a direction opposite to that shown in FIG. 4 relative to base 102. As described in the background section hereof, applications exist wherein base 102 is mounted to vertical walls and also to ceiling structures. Counterbalance mechanism 200 allows for the reversal in direction of the torque applied by transmission gear 222 by positioning direction locking key 228 opposite that shown in FIG. 4. With direction locking key 228 positioned accordingly, pawl 229 permits rotation of ratchet gear 221 only in the direction indicated by arrow 238. When transfer housing 110 is rotated relative to transfer housing 108 with pawl 229 positioned as described, cable 225 is wound against roller guide 226 onto spindle 233 in the opposite direction to that described herein above creating a tension which compresses spring 225 via washer 236 and nut 235. Spring 225 exerts a counter force to the compression which causes a torque in transmission gear 222 in the direction represented by arrow 241. The torque produced by transmission gear 222 in direction 241 causes a moment about the rotation center 242 of arm 100 in the direction indicated by arrow 244. Such moment serves to counterbalance a force of gravity acting upon arm 100 in a direction opposite that of arrow 39. Pawl 229 may be positioned in a variety of settings so as to create an appropriate counterbalancing force for a specific mounting and/or use of CMM arm 100.

Referring again to FIG. 4, another feature of the present invention is shown with regard to the small moment arm 245 created by transfer housing 10. As discussed herein above counterbalance mechanisms of the prior art create a relatively large moment arm and shift the axis of rotation of the arm substantially away from the base. The present invention minimizes the overhung load transferred to base 102 by the weight of arm 100 by disposing counterbalance mechanism 200 in line with center of rotation 242. The distance represented by small moment arm 245 is limited by the size of transmission gear 222 and ratchet gear 221 which are proportioned to provide adequate counterbalance forces. The result is a minimum exertion of overhung force upon base 102.

Figure 6:
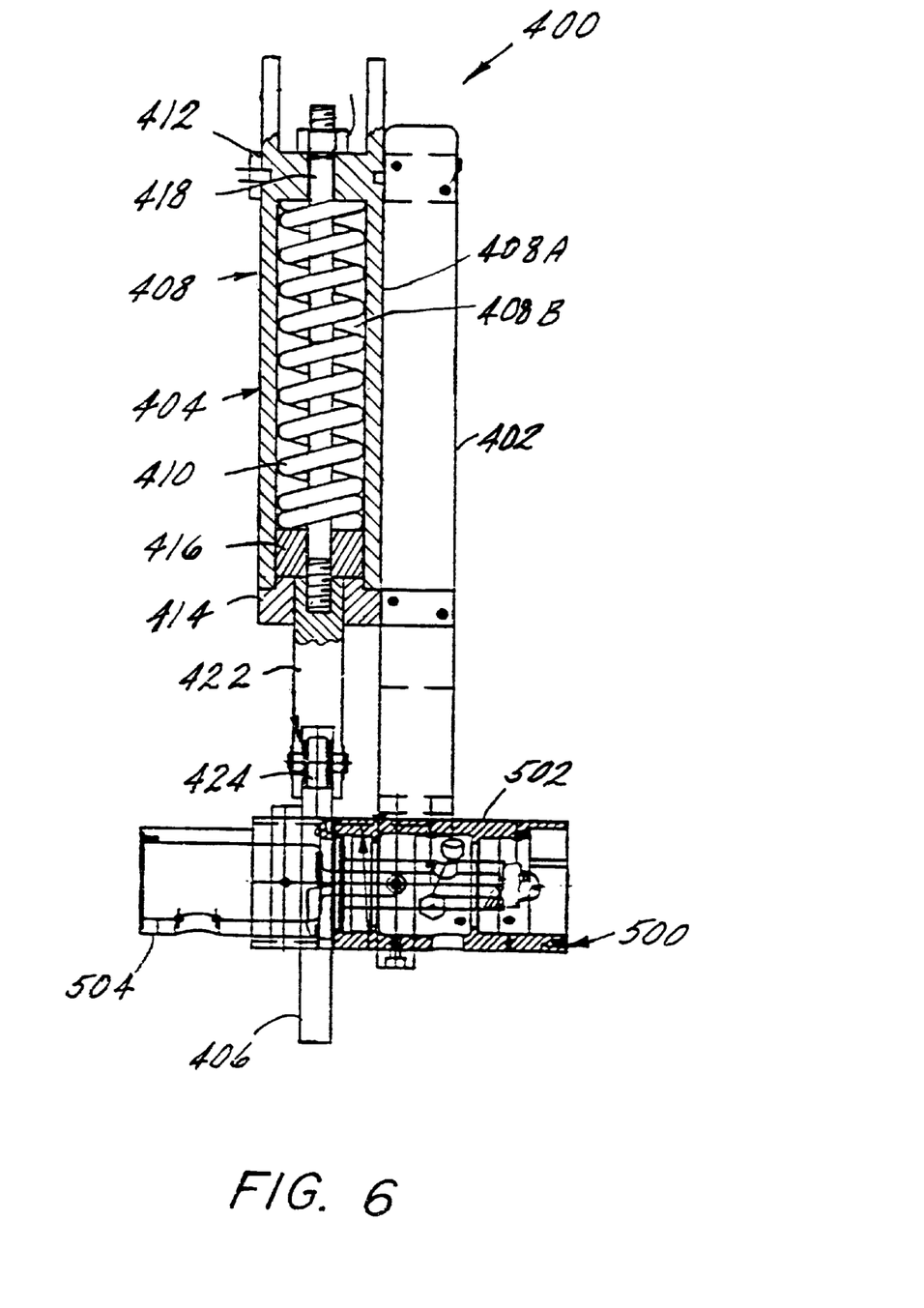
FIG. 6 depicts a cross-sectional side elevational view of a counter balance mechanism in an alternative embodiment.

FIGS. 6–25 depict an alternate embodiment of the invention. FIG. 6 shows a cross-sectional side elevation view of a counter balance mechanism 400 attached to a transfer housing 500. Transfer housing 500 includes a first transfer housing 502 and a second transfer housing 504. First transfer housing 502 rotates relative to second transfer housing 504. The counter balance mechanism 400 includes a bracket 402 and a cam follower assembly 404. Bracket 402 is secured to first transfer housing half 502. Cam follower assembly 404 is secured to bracket 402 through a barrel support bracket 412 and a barrel guide 414 as described in detail further herein.

Cam follower assembly 404 includes a barrel 408 and a plunger 422. The barrel 408 is substantially tubular in shape and contains an outer wall 408A which defines an inner portion 408B. A rod 418 is mounted in barrel 408 such that rod 418 traverses through the center of inner portion 408B, parallel to outer wall 408A. A compression spring 410 is disposed around rod 418 in inner portion 408B of barrel 408.

A spacer 416, as further described herein, travels along rod 418 to compress compression spring 410. One end of rod 418 is secured to the barrel 408 by a nut 420 which engages threads on rod 418. The other end of the rod 418 is connected to plunger 422. Plunger 422 includes a cam roller 424 mounted to plunger 422 opposite rod 418. Cam roller 424 contacts a cam 406 and enables cam follower assembly 404 to rotate about cam 406. As the cam roller 424 moves over the surface of cam 406, plunger 422 moves the spacer 416 upwards and downwards within barrel 408. As will be discussed in detail further herein, this compresses and releases compression spring 410. Controlling the surface of the cam 406 allows a counter balancing force to be generated based on rotation of the transfer housing.

Figure 7:
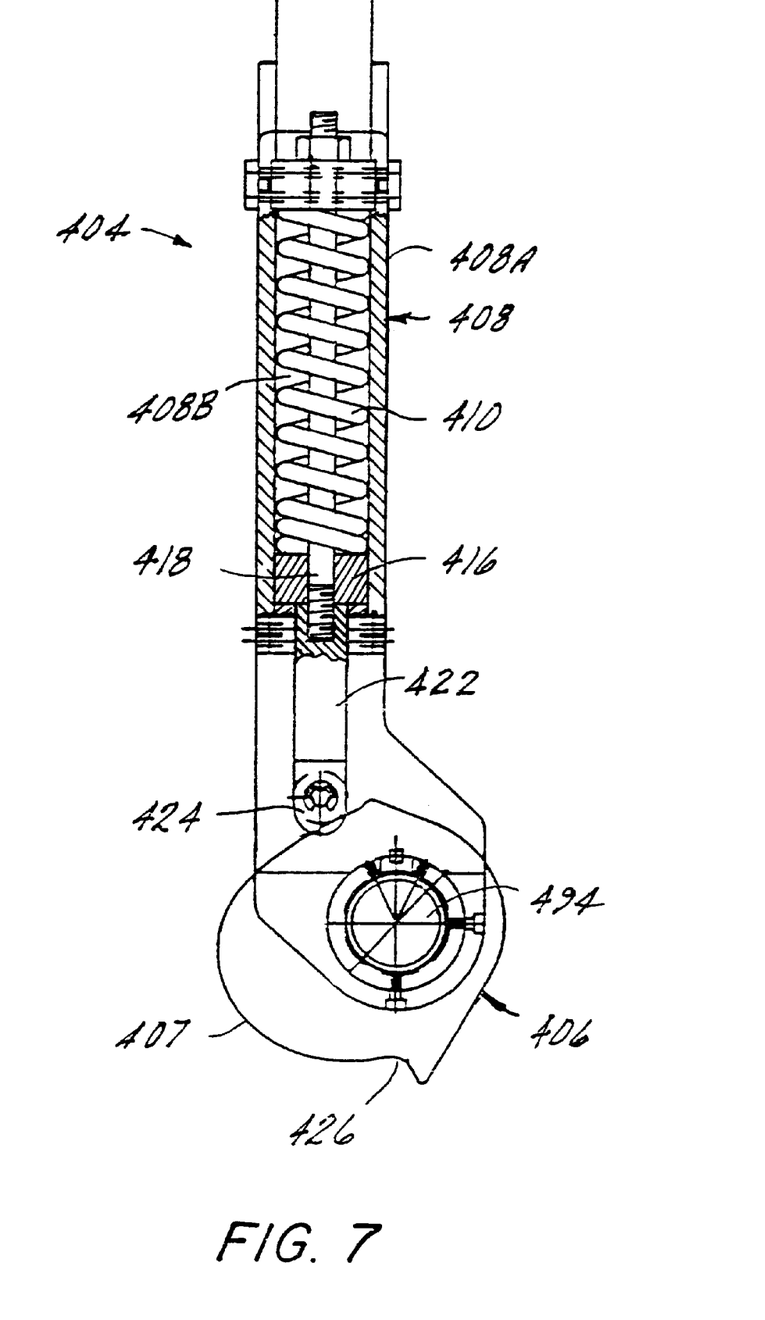
FIG. 7 is a cross-sectional side elevational view of the counter balance mechanism of FIG. 6.

FIG. 7 is a cross-sectional side elevation view of the cam follower assembly 404 and cam 406. Cam 406 includes a cam surface 407, a detent 426, and an opening 494. As the cam follower assembly 404 is moved, the cam roller 424 travels over the cam surface 407. At areas of greater radius of cam 406, plunger 422 is directed into inner portion 408B of barrel 408 forcing spacer to travel on rod 418 away from cam 406, thereby compressing compression spring 410. The force created by compression spring 410 counter balances the movement of cam follower assembly 404 by seeking to rotate cam follower assembly to a position which creates the least compression in spring 410. Detent 426 defines a rest position for the cam follower in which spring 410 is in its least compressed state. The counter balancing force generated by the compression of spring 410 is directed at returning cam follower assembly to detent 426. Traversing the edge of detent 426 requires compression of spring 410 and thus the force of spring 410 helps to maintain the arm in the rest position of detent 426.

Figure 8:
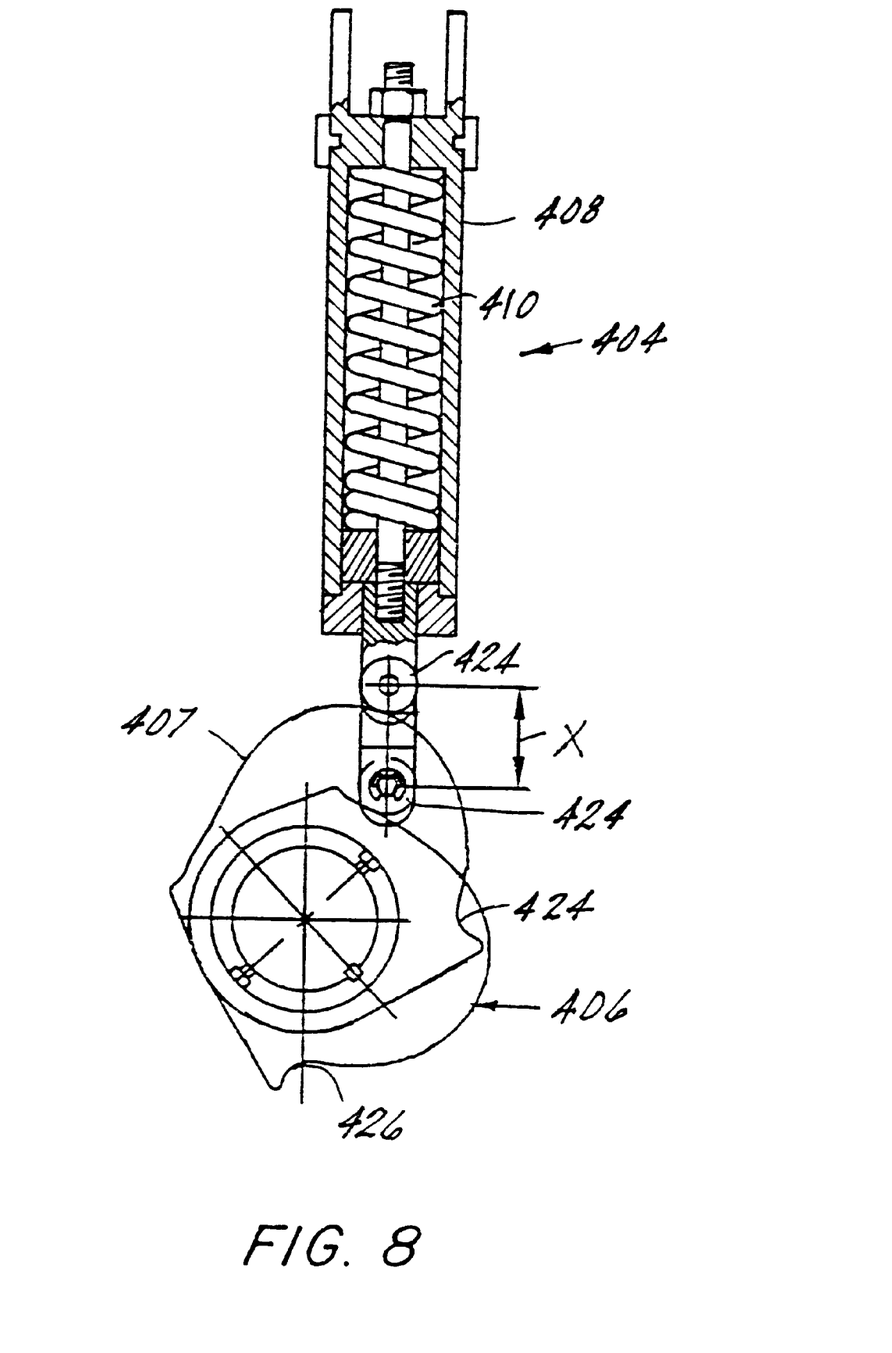
FIG. 8 is a cross-sectional side elevation view of the counter balance mechanism of FIG. 6.

FIG. 8 shows a cross-sectional side elevation view of counter balance mechanism 400 in two different positions with cam roller 424 in two different positions on the surface of cam 406. As can be seen from FIG. 8, the travel of the cam roller 424 over the cam 406 creates a compression of distance x of the compression spring 410 depending upon the positioning of cam roller 424 along the cam surface 407 of cam 406. When the compression spring 410 is compressed, it tends to drive the cam roller 424 to a location on cam 406 where the spring 410 is less compressed, i.e. an area of reduced radius on cam 406. Accordingly, effects of gravity or other forces acting on the arm can be overcome by using a cam surface specifically shaped to compress spring 410 to counteract said forces.

Figure 9:
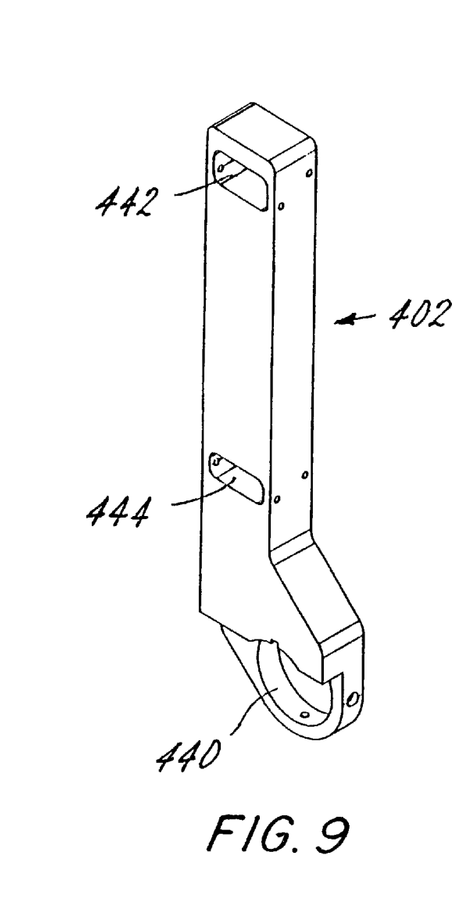
FIGS. 9–11 are various views of a support bracket.
Figure 10:
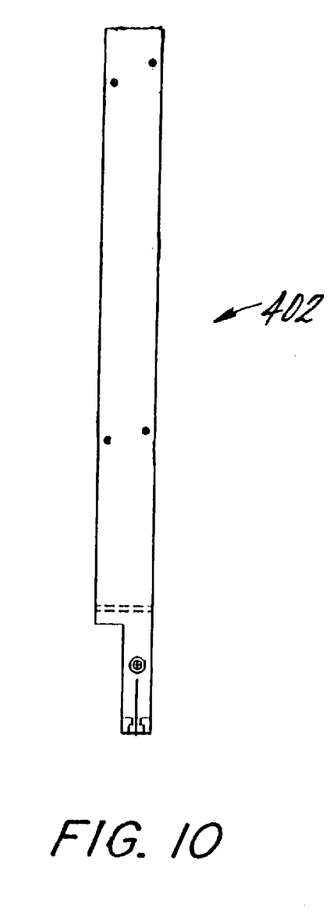
Figure 11:
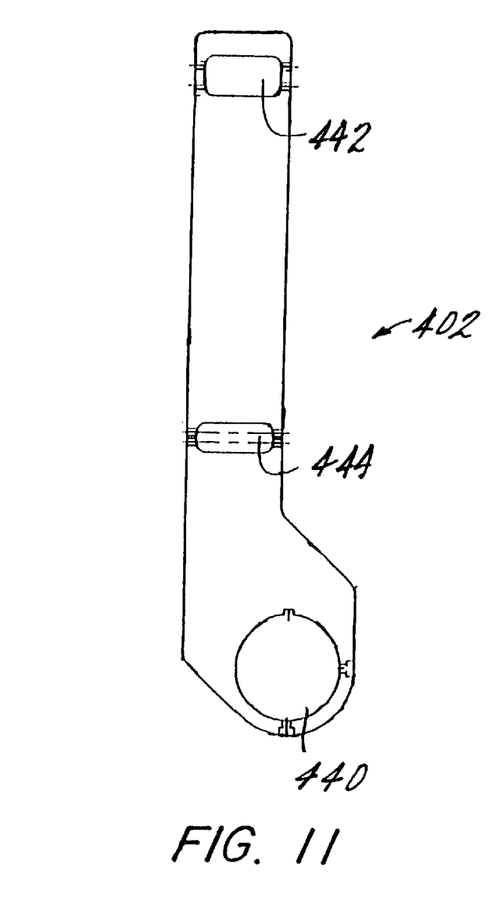

FIGS. 9–11 are various views of bracket 402. The bracket 402 has a housing opening 440 for receiving the first transfer housing 502 and may be secured to the first transfer housing 502 through use of a variety of fasteners. The bracket 402 also includes a barrel support bracket opening 442 for receiving barrel support bracket 412. The bracket further includes a barrel guide opening 444 which receives barrel guide 414 when securing cam follower assembly 404 to bracket 402.

Figure 12:
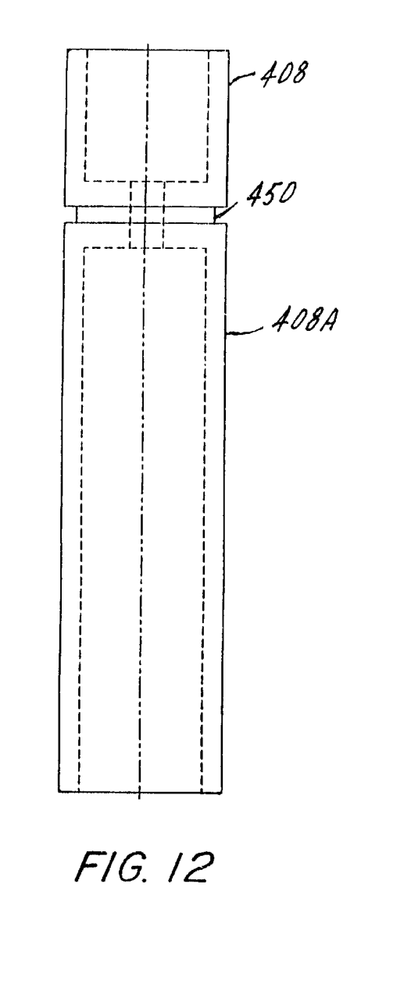
FIGS. 12 and 13 are views of a barrel.
Figures 13, 14, 15:
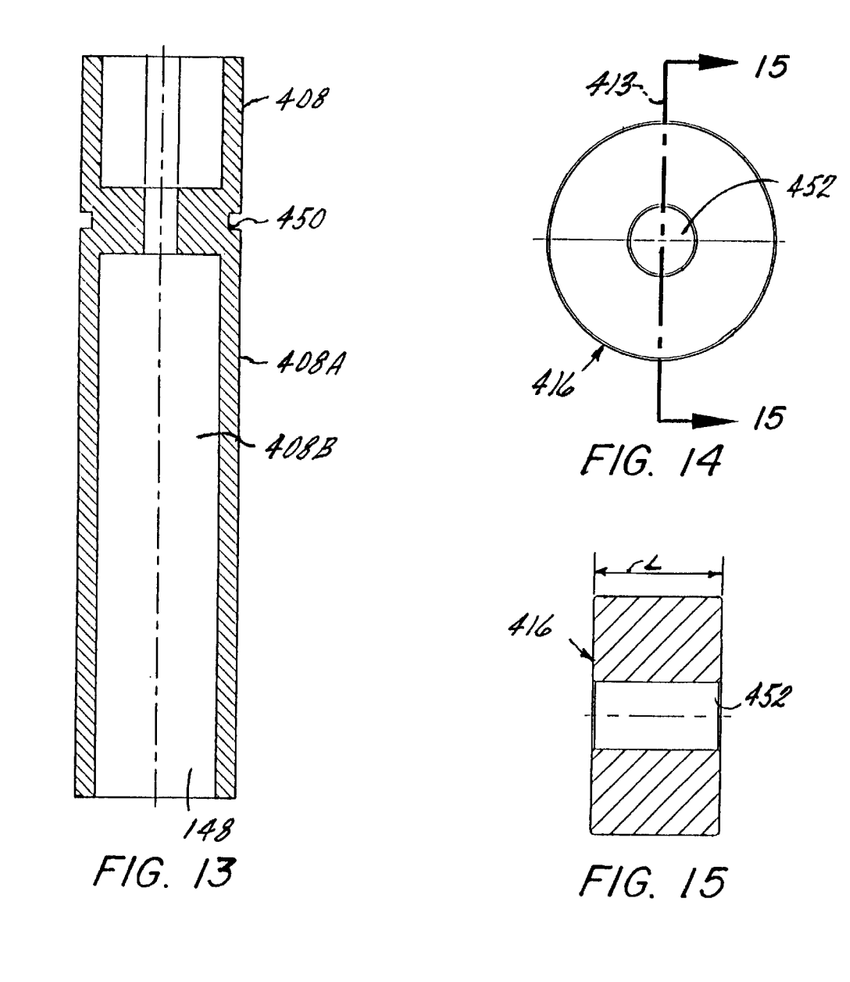
FIGS. 14–15 are cross-sectional views of a spacer.

FIG. 12 is a side elevational view of the barrel 408 of a cam follower assembly 404 and FIG. 13 is a cross-sectional side elevational view of barrel 408. The barrel 408 is hollow, cylindrical structure comprising an outer wall 408A which defines an inner portion 408B. Compression spring 410 is received in inner portion 408B of barrel 408. Outer wall 408A of the barrel 408 includes a groove 450 for receiving a raised ring 464 on barrel support bracket 412 as described in detail herein with reference to FIG. 16.

FIG. 14 is a side elevational view of the spacer 416 and FIG. 15 is a cross-sectional view of spacer 116 along axis 413 shown in FIG. 14. The spacer 416 is generally cylindrical and has an opening 452 formed there through for receiving rod 418. The spacer 416 may be manufactured in varying lengths L to provide for enhanced compression of spring 410. For example, to pre-load the spring 410, the length L of spacer 416 can be increased. Alternatively, to reduce the compression of spring 410, the length L is reduced. In this manner, the counter balancing device can be adjusted to different coordinate measuring machine arms and different arm applications.

Figure 16:
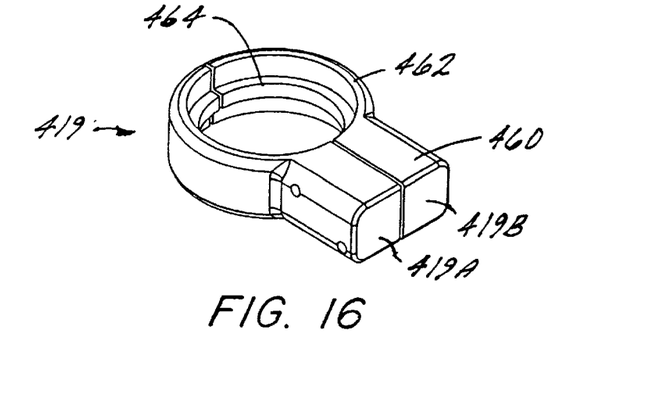
FIGS. 16–18 are various views of a barrel support bracket.
Figure 17:
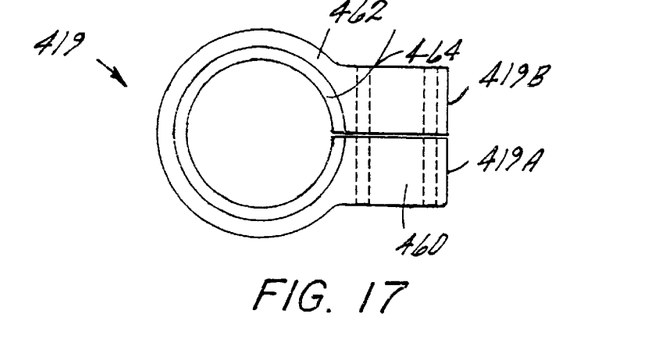
Figure 18:
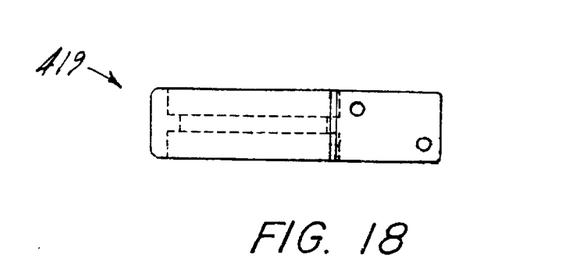

FIGS. 16–18 are various views of the barrel support bracket 419. The barrel support bracket 419 includes a rectangular base 460 and a circular portion 462. The inside surface of circular portion 462 includes a raised ring 464. The barrel support bracket 408 may be formed in two halves, a first half 419A and a second half 419B, to ease in mounting. The rectangular base 460 of first half 419A is inserted into opening 442 on bracket 402 and fixed with fasteners. Barrel 408 is placed inside circular portion 462 such that groove 450 engages circular ring 464. The rectangular base 460 of second half 419B of barrel support bracket 419 is inserted into opening 442 on bracket 402 such that circular ring 464 engages groove 450. Second half 419B is then secured to bracket 402 by use of fasteners.

Figure 19:
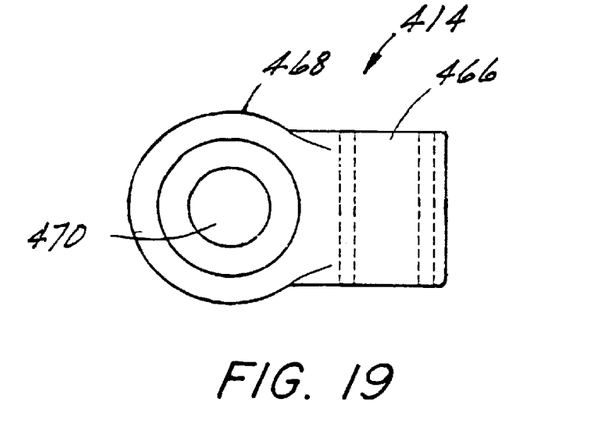
FIGS. 19–20 are various views of a barrel guide.
Figure 20:
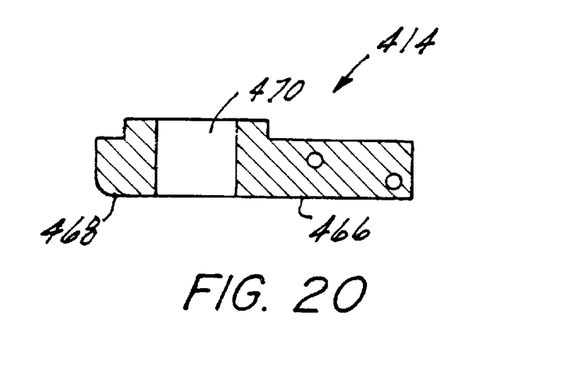

FIG. 19 is a top view of barrel guide 414 and FIG. 20 is a cross sectional view of barrel guide 414. The barrel guide 414 includes a guide base 466 and a circular portion 468 rigidly attached to the guide base 466. The guide base 466 is substantially rectangular in shape and is mounted in opening 444 in bracket 402. The circular portion 468 includes an opening 470 which receives plunger 422.

Figure 21:
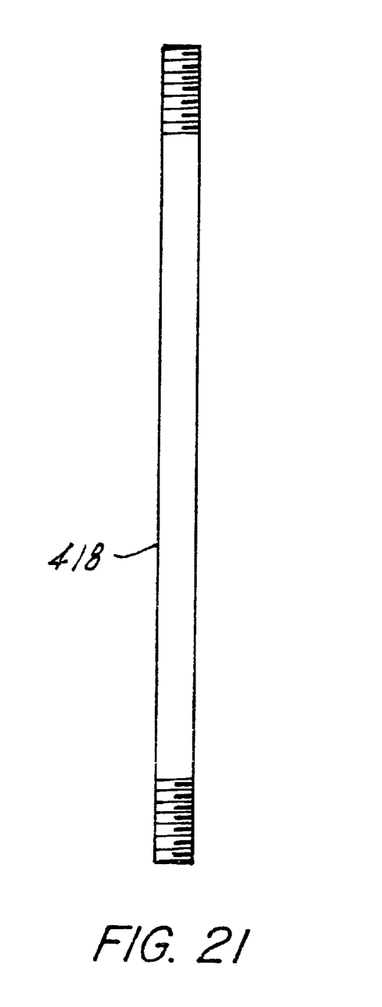
FIG. 21 is a side view of a rod.

FIG. 21 is a side elevational view of rod 418. Rod 418 is substantially cylindrical in shape and is of sufficient length to extend from nut 420 through inner portion 408B of barrel 408 and into plunger 422. Both ends of rod 418 are threaded to enable the secure fitting of rod 418 into plunger 422 and nut 420 at opposite ends of rod 418.

Figure 22:
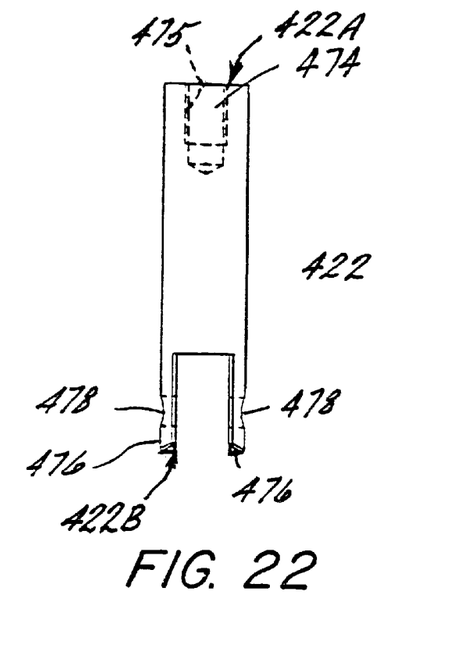
FIGS. 22–23 are various views of a plunger.
Figure 23:
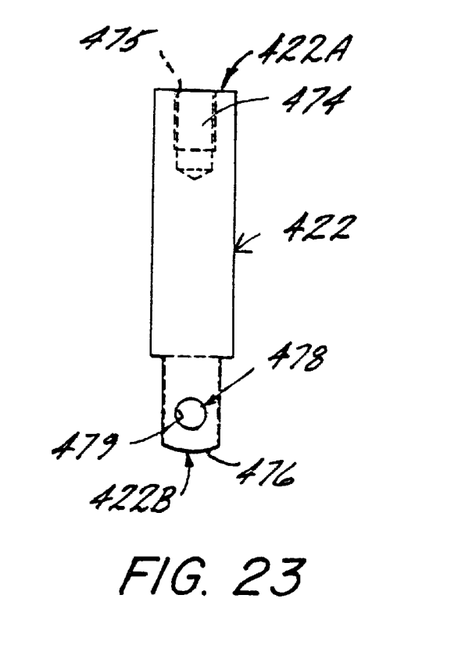
Figure 24:
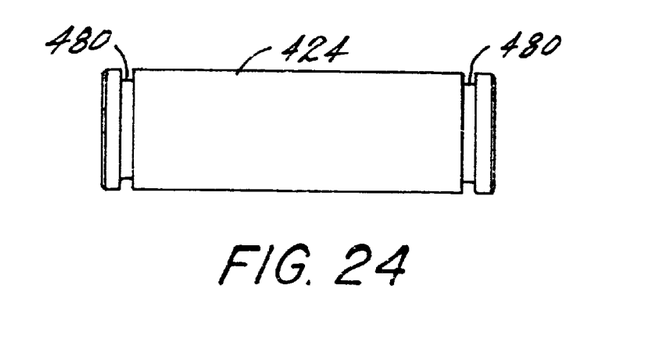
FIG. 24 is a side view of a cam roller.

FIGS. 22 and 23 show various elevational views of plunger 422. Plunger 422 includes a rod end 422A and a cam end 422B. Rod end 422A includes an internally threaded opening 475 which mates with threads on one end of rod 418. Cam end 422B of plunger 422 includes a pair of arms 476, each having a concavity 478 formed therein. Located within each concavity 478 is a mounting hole 479 which receives cam roller 424. FIG. 24 depicts the cam roller 424 which is placed in mounting holes 479. The cam roller 424 includes cut-outs 480 which may receive C-clips to secure the cam roller 424 to arms 476.

Figure 25:
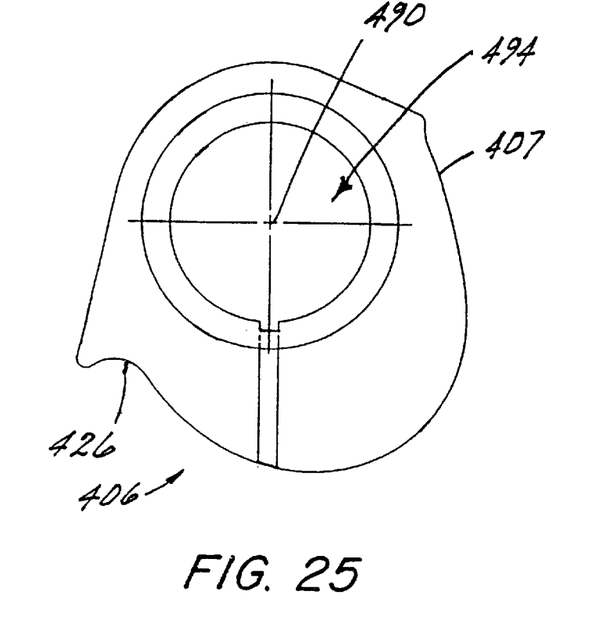
FIGS. 25–27 are various views of a cam.
Figure 26:
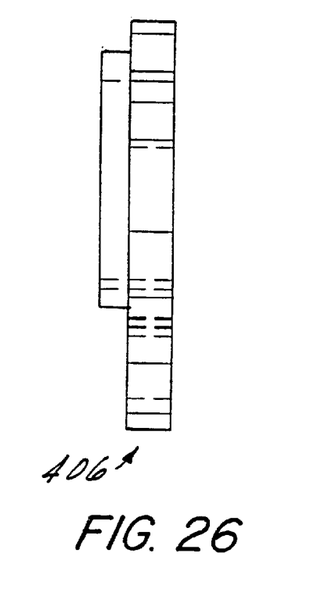
Figure 27:
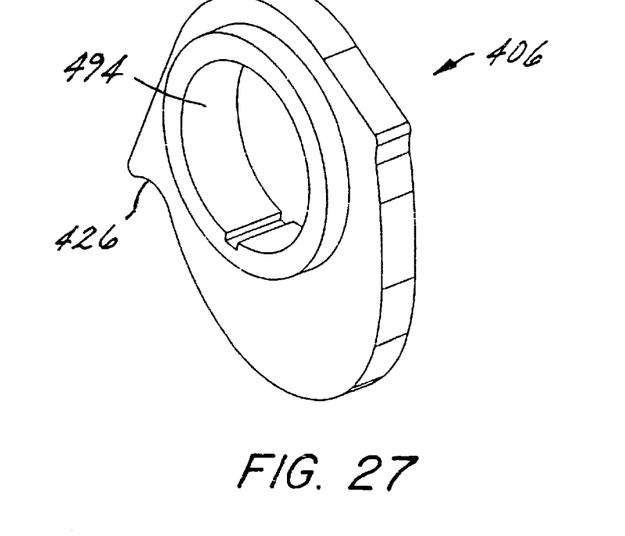

FIGS. 25–27 are views of an exemplary cam 406. An opening 494 is formed through cam 406 for mounting the cam 406 on second transfer housing 504. The cam 406 includes a center of rotation 490 and an outside surface 407. The distance from the center of rotation 490 to the surface 407 varies as a function of angular position. By specifying the surface 407 on cam 406, the amount of compression of spring 410 can be controlled at different angular positions along the cam surface. The cam 406 also includes a rest position detent 426 as described above.

According to the present invention, an adjustable counterbalance mechanism for a multi-jointed coordinate measurement machine arm is provided. The mechanism creates a counter balancing force which opposes other forces acting upon the arm thereby increasing maneuverability of said arm and ensuring safety of usage. The mechanism also diminishes the effects of overhung forces by reducing the moment arm created at joints corresponding to the placement of said mechanism. Further, the present invention allows for rapid and easy adjustment of the forces produced by the counterbalancing mechanism to facilitate various CMM applications involving a variety of mountings, a variety of end probes, and a variety of individual users.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A counterbalance device for use with a rotatably maneuverable member, the device comprising:
   a ratchet assembly rotatably disposed outside the member;
   a transmission gear rotatably disposed at the center of rotation of said member in meshing engagement with said ratchet assembly;
   a cable spool having a spool gear rotatably disposed in the member in meshing engagement with said transmission gear;
   a cable attached to said cable spool;
   a spring element disposed within the member having a supported first spring end a second spring end attached to said cable.

2. The device of claim 1 wherein said ratchet assembly further comprises a ratchet gear, a pawl in meshing engagement with said ratchet gear, and a locking key for adjusting said ratchet assembly, the locking key adjacent to and in contact with the pawl.

3. The device of claim 2 wherein the pawl has a first position allowing manual rotation of the ratchet gear in a first direction creating a moment in the member in a first direction and wherein the pawl has a second position allowing manual rotation of the ratchet gear in a second direction creating a moment in the member in a second direction.

4. The counterbalance device of claim 3 wherein manual rotation of the ratchet gear winds the cable about the spool creating tension in the spring which is distributed to the arm as torque in varying magnitudes as a function of angular position.

5. The device of claim 3 wherein said pawl is positionable by movement of the locking key.

6. The counterbalance device of claim 1 further comprising a pair of roller guides rotatably disposed between said cable spool and the support member of said spring, the pair of roller guides guiding the said cable into said cable spool.

7. The counterbalance device of claim 1 wherein said device further comprises a barrier member disposed adjacent to and perpendicular to the first end of said spring proximate to the said cable spool, the barrier member having an opening to allow passage of said cable.

8. The counterbalance device of claim 1 wherein said device is part of a three dimensional multi-directional coordinate measuring machine arm, the arm comprising:
   a base;
   an extension assembly having a plurality of extension members;
   a probe end;
   a plurality of transfer housings paired and mounted so as to rotatably join the base, the extension assembly, and the probe end.

* * * * *

UNITED STATES PATENT AND TRADEMARK OFFICE
CERTIFICATE OF CORRECTION

PATENT NO. : 6,253,458 B1
DATED : July 3, 2001
INVENTOR(S) : Raab et al.

It is certified that error appears in the above-identified patent and that said Letters Patent is hereby corrected as shown below:

Column 5,
Line 37, after "housing" delete "10." and insert therefor -- 110 --

Signed and Sealed this

Thirtieth Day of November, 2004

JON W. DUDAS
*Director of the United States Patent and Trademark Office*